(12) United States Patent
McGuire, Jr.

(10) Patent No.: US 10,002,645 B2
(45) Date of Patent: Jun. 19, 2018

(54) LAMINATE-WRAPPED HARD DISK DRIVES AND RELATED METHODS

(71) Applicant: entrotech, inc., Columbus, OH (US)

(72) Inventor: James E. McGuire, Jr., Tiburon, CA (US)

(73) Assignee: entrotech, inc., Columbus, OH (US)

( * ) Notice: Subject to any disclaimer, the term of this patent is extended or adjusted under 35 U.S.C. 154(b) by 89 days.

(21) Appl. No.: 15/109,912

(22) PCT Filed: Jun. 8, 2015

(86) PCT No.: PCT/US2015/034747
§ 371 (c)(1),
(2) Date: Jul. 6, 2016

(87) PCT Pub. No.: WO2015/191479
PCT Pub. Date: Dec. 17, 2015

(65) Prior Publication Data
US 2016/0329081 A1    Nov. 10, 2016

Related U.S. Application Data

(60) Provisional application No. 62/009,843, filed on Jun. 9, 2014.

(51) Int. Cl.
*G11B 5/09*    (2006.01)
*G11B 33/02*   (2006.01)
(Continued)

(52) U.S. Cl.
CPC .......... *G11B 33/022* (2013.01); *G11B 25/043* (2013.01); *G11B 33/122* (2013.01); *G11B 33/1406* (2013.01); *G11B 33/1446* (2013.01)

(58) Field of Classification Search
None
See application file for complete search history.

(56) References Cited

U.S. PATENT DOCUMENTS

| | | |
|---|---|---|
| 3,596,828 A | 8/1971 | Foster et al. |
| 4,058,632 A | 11/1977 | Evans et al. |

(Continued)

FOREIGN PATENT DOCUMENTS

| | | |
|---|---|---|
| EP | 0546680 | 6/1993 |
| EP | 1262304 B1 | 4/2012 |

(Continued)

OTHER PUBLICATIONS

"Donaldson Filtration Systems Adsorbent Label Filter (ALF): Disk Drive," Donaldson Company, Inc., Minneapolis, MN (Jul. 31, 2010).

(Continued)

*Primary Examiner* — Peter Vincent Agustin
(74) *Attorney, Agent, or Firm* — The Griffith Law Firm, A P.C.; Lisa M. Griffith

(57) ABSTRACT

Hard disk drives of the invention are wrapped in laminate for enhanced sealing of the hard disk drive. Laminate-wrapped hard disk drives of the invention comprise: an enclosed hard disk drive housing comprising a base and a cover enclosed around internal components for facilitating reading and recording of data at a desired location on at least one disk contained within the housing; and a laminate wrapped around the enclosed housing in an at least partially overlapping manner to form the laminate-wrapped hard disk drive and prevent undesired migration therethrough such that a sealed environment exists within the laminate-wrapped hard disk drive, wherein the laminate comprises a barrier layer and an adhesive layer for adherence of the laminate to the enclosed housing.

41 Claims, 4 Drawing Sheets

(51) Int. Cl.
*G11B 25/04* (2006.01)
*G11B 33/12* (2006.01)
*G11B 33/14* (2006.01)

(56) References Cited

U.S. PATENT DOCUMENTS

| | | |
|---|---|---|
| 4,096,309 A | 6/1978 | Stillman |
| 4,284,672 A | 8/1981 | Stillman |
| 4,306,259 A | 12/1981 | Saito et al. |
| 4,367,503 A | 1/1983 | Treseder |
| 4,642,715 A | 2/1987 | Ende |
| 4,662,521 A | 5/1987 | Moretti |
| 4,686,592 A | 8/1987 | Carroll et al. |
| 4,795,907 A | 1/1989 | Maekawa et al. |
| 4,855,849 A | 8/1989 | Jones et al. |
| 4,965,691 A | 10/1990 | Iftikar et al. |
| 5,025,335 A | 6/1991 | Stefansky |
| 5,147,086 A | 9/1992 | Fujikawa et al. |
| 5,150,267 A | 9/1992 | Reinisch et al. |
| 5,157,831 A | 10/1992 | Wang et al. |
| 5,175,657 A | 12/1992 | Iftikar et al. |
| 5,214,550 A | 5/1993 | Chan |
| 5,233,491 A | 8/1993 | Kadonaga et al. |
| 5,235,481 A | 8/1993 | Kamo et al. |
| 5,243,495 A | 9/1993 | Read et al. |
| 5,247,410 A | 9/1993 | Ebihara et al. |
| 5,253,129 A | 10/1993 | Blackborow et al. |
| 5,270,887 A | 12/1993 | Edwards et al. |
| 5,282,099 A | 1/1994 | Kawagoe et al. |
| 5,317,463 A | 5/1994 | Lemke et al. |
| 5,376,424 A | 12/1994 | Watanabe |
| 5,454,157 A | 10/1995 | Ananth et al. |
| 5,536,917 A | 7/1996 | Suppelsa et al. |
| 5,559,650 A | 9/1996 | Repphun et al. |
| 5,587,854 A | 12/1996 | Sato et al. |
| 5,587,855 A | 12/1996 | Kim |
| 5,608,592 A | 3/1997 | Mizoshita et al. |
| 5,703,735 A | 12/1997 | Bleeke |
| 5,722,538 A | 3/1998 | Neely et al. |
| 5,732,063 A | 3/1998 | Chen |
| 5,751,514 A | 5/1998 | Hyde et al. |
| 5,781,373 A | 7/1998 | Larson et al. |
| 5,837,934 A | 11/1998 | Valavanis et al. |
| 5,880,904 A | 3/1999 | Mizoshita et al. |
| 5,898,537 A | 4/1999 | Oizumi et al. |
| 5,969,901 A | 10/1999 | Eckberg et al. |
| 6,008,965 A | 12/1999 | Izumi et al. |
| 6,023,392 A | 2/2000 | Kim |
| 6,108,164 A | 8/2000 | Weber |
| 6,129,579 A | 10/2000 | Cox et al. |
| 6,168,459 B1 | 1/2001 | Cox et al. |
| 6,181,530 B1 | 1/2001 | Ratliff et al. |
| 6,226,143 B1 | 5/2001 | Stefanksy |
| 6,236,532 B1 | 5/2001 | Yanagisawa |
| 6,243,262 B1 | 6/2001 | Koo et al. |
| 6,258,432 B1 | 7/2001 | Terada et al. |
| 6,317,286 B1 | 11/2001 | Murphy et al. |
| 6,339,521 B1 | 1/2002 | Durrum et al. |
| 6,357,001 B1 | 3/2002 | Brower et al. |
| 6,392,838 B1 | 5/2002 | Hearn et al. |
| 6,397,932 B1 | 6/2002 | Calaman et al. |
| 6,407,659 B2 | 6/2002 | Mochida et al. |
| 6,430,000 B1 | 8/2002 | Rent |
| 6,438,685 B1 | 8/2002 | Brower et al. |
| 6,442,021 B1 | 8/2002 | Bolognia et al. |
| 6,469,864 B2 | 10/2002 | Kamezawa et al. |
| 6,473,264 B2 | 10/2002 | Bae et al. |
| 6,480,353 B1 | 11/2002 | Sacks et al. |
| 6,525,899 B2 | 2/2003 | Hearn et al. |
| 6,560,064 B1 | 5/2003 | Hirano |
| 6,570,736 B2 | 5/2003 | Noda |
| 6,639,757 B2 | 10/2003 | Morley et al. |
| 6,646,821 B2 | 11/2003 | Bernett et al. |
| 6,650,961 B2 | 11/2003 | Deckers |
| 6,673,460 B2 | 1/2004 | Imai et al. |
| 6,678,112 B1 | 1/2004 | Kaneko |
| 6,693,767 B1 | 2/2004 | Butler |
| 6,762,909 B2 | 7/2004 | Albrecht et al. |
| 6,765,751 B2 | 7/2004 | Huang et al. |
| 6,785,082 B2 | 8/2004 | Fiorvanti et al. |
| 6,831,811 B1 | 12/2004 | Andrikowich et al. |
| 6,876,514 B1 | 4/2005 | Little |
| 6,934,118 B2 | 8/2005 | Hidaka et al. |
| 6,934,958 B2 | 8/2005 | Lin et al. |
| 6,940,687 B2 | 9/2005 | Hong et al. |
| 7,054,153 B2 | 5/2006 | Lewis et al. |
| 7,082,012 B2 | 7/2006 | Macpherson et al. |
| 7,119,984 B2 | 10/2006 | Macleod et al. |
| 7,130,149 B2 | 10/2006 | Hong et al. |
| 7,206,164 B2 | 4/2007 | Hofland et al. |
| 7,218,473 B2 | 5/2007 | Bernett et al. |
| 7,239,593 B2 | 7/2007 | Abe |
| 7,274,534 B1 | 9/2007 | Choy et al. |
| 7,285,318 B2 | 10/2007 | Kaku et al. |
| 7,295,399 B2 | 11/2007 | Konno et al. |
| 7,300,500 B2 | 11/2007 | Okada et al. |
| 7,301,776 B1 | 11/2007 | Wang et al. |
| 7,315,447 B2 | 1/2008 | Inoue et al. |
| 7,330,334 B2 | 2/2008 | Shimizu et al. |
| 7,362,541 B2 | 4/2008 | Bernett et al. |
| 7,414,813 B2 | 8/2008 | Huynh |
| 7,420,771 B1 | 9/2008 | Hanke et al. |
| 7,484,291 B1 | 2/2009 | Ostrander et al. |
| 7,508,622 B2 | 3/2009 | Martin et al. |
| 7,525,758 B2 | 4/2009 | Abe |
| 7,570,460 B2 | 8/2009 | Kitahori et al. |
| 7,616,400 B2 | 11/2009 | Byun et al. |
| 7,630,169 B2 | 12/2009 | Murakami |
| 7,684,146 B1 | 3/2010 | Andrikowich et al. |
| 7,813,129 B2 | 10/2010 | Van Der Werff |
| 7,821,735 B1 | 10/2010 | Bogacz et al. |
| 8,014,167 B2 | 9/2011 | Gunderson et al. |
| 8,018,687 B1 | 9/2011 | Little et al. |
| 8,098,454 B2 | 1/2012 | Kouno et al. |
| 8,194,348 B2 | 6/2012 | Jacoby et al. |
| 8,248,724 B2 | 8/2012 | Hayakawa et al. |
| 8,248,777 B2 | 8/2012 | Prest |
| 8,274,755 B2 | 9/2012 | Ishima et al. |
| 8,427,787 B2 | 4/2013 | McGuire, Jr. |
| 8,451,559 B1 | 5/2013 | Berding et al. |
| 8,533,934 B2 | 9/2013 | McGuire, Jr. et al. |
| 8,593,760 B2 | 11/2013 | McGuire, Jr. |
| 8,599,514 B2 | 12/2013 | McGuire, Jr. |
| 8,659,849 B2 | 2/2014 | Hayakawa et al. |
| 8,859,913 B2 | 10/2014 | Judy |
| 9,190,115 B2 | 11/2015 | McGuire, Jr. et al. |
| 2001/0042301 A1 | 11/2001 | Khuu |
| 2002/0149885 A1 | 10/2002 | Dague et al. |
| 2002/0196580 A1 | 12/2002 | Tsukahara et al. |
| 2003/0081347 A1 | 5/2003 | Neal et al. |
| 2003/0081349 A1 | 5/2003 | Bernett |
| 2003/0089417 A1 | 5/2003 | Bernett |
| 2003/0179488 A1 | 9/2003 | Kant et al. |
| 2003/0179489 A1 | 9/2003 | Bernett et al. |
| 2003/0223148 A1 | 12/2003 | Macleod et al. |
| 2004/0070867 A1 | 4/2004 | Kudo et al. |
| 2004/0134825 A1 | 7/2004 | Navickas |
| 2004/0150909 A1 | 8/2004 | Kimura |
| 2004/0169956 A1 | 9/2004 | Oba et al. |
| 2004/0184184 A1 | 9/2004 | Komatsu et al. |
| 2004/0207980 A1 | 10/2004 | Kobayashi |
| 2005/0013039 A1 | 1/2005 | Matsumura et al. |
| 2005/0041334 A1 | 2/2005 | Kim et al. |
| 2005/0057849 A1 | 3/2005 | Twogood et al. |
| 2005/0094312 A1 | 5/2005 | Sato |
| 2005/0130457 A1 | 6/2005 | Nozaki et al. |
| 2005/0237708 A1 | 10/2005 | Chen |
| 2006/0050429 A1 | 3/2006 | Gunderson et al. |
| 2006/0139873 A1 | 6/2006 | Tomizawa et al. |
| 2006/0176610 A1 | 8/2006 | Tsuda et al. |
| 2006/0232891 A1* | 10/2006 | Bushnik ............ G01D 3/08 360/265.6 |
| 2007/0002489 A1 | 1/2007 | Abe |
| 2007/0034406 A1 | 2/2007 | Schroader |

(56) References Cited

U.S. PATENT DOCUMENTS

| | | |
|---|---|---|
| 2007/0171567 A1 | 7/2007 | Choi et al. |
| 2007/0171568 A1 | 7/2007 | Boss et al. |
| 2008/0084631 A1 | 4/2008 | Chan et al. |
| 2008/0088969 A1 | 4/2008 | Uefune et al. |
| 2008/0174910 A1 | 7/2008 | Hirono et al. |
| 2008/0212237 A1 | 9/2008 | Uefune et al. |
| 2008/0226534 A1 | 9/2008 | Gidumal et al. |
| 2009/0073328 A1 | 3/2009 | Gunderson et al. |
| 2009/0073842 A1 | 3/2009 | Kim |
| 2009/0107697 A1* | 4/2009 | Price ............... G11B 25/043 174/137 B |
| 2009/0116141 A1 | 5/2009 | Brown |
| 2009/0183475 A1 | 7/2009 | Dauber et al. |
| 2009/0256244 A1 | 10/2009 | Liao et al. |
| 2009/0290294 A1 | 11/2009 | Prest |
| 2011/0122567 A1 | 5/2011 | Cheah et al. |
| 2011/0135949 A1 | 6/2011 | Elia |
| 2011/0212281 A1 | 9/2011 | Jacoby et al. |
| 2012/0120562 A1 | 5/2012 | Prest et al. |
| 2012/0164446 A1 | 6/2012 | Nakahira et al. |
| 2012/0275052 A1 | 11/2012 | McGuire, Jr. |
| 2012/0275053 A1 | 11/2012 | McGuire, Jr. |
| 2012/0275054 A1 | 11/2012 | McGuire, Jr. |
| 2012/0275055 A1 | 11/2012 | McGuire, Jr. |
| 2012/0275056 A1 | 11/2012 | McGuire, Jr. |
| 2012/0275057 A1 | 11/2012 | McGuire, Jr. |
| 2012/0275105 A1 | 11/2012 | McGuire, Jr. |
| 2012/0275106 A1 | 11/2012 | McGuire, Jr. |
| 2012/0275285 A1 | 11/2012 | McGuire, Jr. |
| 2012/0275286 A1 | 11/2012 | McGuire, Jr. |
| 2012/0275287 A1 | 11/2012 | McGuire, Jr. |
| 2013/0277101 A1 | 10/2013 | Judy |
| 2014/0118927 A1 | 5/2014 | Hamburgen |
| 2015/0029615 A1* | 1/2015 | Chembrolu ............... G11B 5/11 360/235.4 |
| 2015/0069056 A1 | 3/2015 | Kishimoto et al. |
| 2016/0104515 A1 | 4/2016 | Strange |
| 2016/0307606 A1 | 10/2016 | McGuire, Jr. et al. |

FOREIGN PATENT DOCUMENTS

| | | |
|---|---|---|
| GB | 0 173 783 | 1/1923 |
| GB | 1 475 080 | 6/1977 |
| JP | 06-008947 | 1/1994 |
| JP | 06-218799 | 8/1994 |
| JP | 08-045256 | 2/1996 |
| JP | 10-055662 | 2/1998 |
| JP | 2000-215642 | 8/2000 |
| JP | 2009-038269 A | 2/2009 |
| JP | 2011-240934 | 12/2011 |
| WO | WO-2005/117018 | 12/2005 |
| WO | WO-2015/164551 | 10/2015 |
| WO | WO-2015/191479 | 12/2015 |

OTHER PUBLICATIONS

"Donaldson Filtration Systems Adsorbent Pouch Filter (APF): Disk Drive," Donaldson Company, Inc., Minneapolis, MN (Jul. 31, 2010).

"First Hermetically Sealed, Helium HDD Platform Provides Path for Higher Capacity Storage, While Significantly Lowering Power and Cooling, and Improving Storage Density," http://www.hgst.com/press-room/press-releases/hgst-ships-6TB-Ultrastar-HE6-helium-filled (Nov. 4, 2013).

"Infrared," http://en.wikipedia.org/wiki/Infrared (Feb. 14, 2011).

"Laser Makes Invisible Welds in Plastics," *Connect*, No. 100; http://www.twi.co.uk/content/c1008b.html (May 31, 1999).

"Laser Welding of Plastics (Knowledge Summary)," http://www.twi.co.uk/content/ksab002.html (Dec. 31, 2009).

"Nd:YAG laser," http://en.wikipedia.org/wiki/Nd:YAG_laser (Feb. 14, 2011).

Jones, Ian, "Clearweld (Knowledge Summary)," http://www.twi.co.uk/content/ksiaj001.html (Dec. 31, 2010).

Venkat, Sri et al., "Sealing Plastic Seams With Laser Welding," www.devicelink.com/mddi (May 31, 2008).

Warwick, Marcus et al., "Application Studies Using Through-Transmission Laser Welding of Polymers," http://www.twi.co.uk/content/spcmwapr2006.html (Apr. 25, 2006).

* cited by examiner

LAMINATE-WRAPPED HARD DISK DRIVES AND RELATED METHODS

BACKGROUND OF THE INVENTION

The present invention relates generally to hard disk drives and methods for wrapping of laminates therearound.

Coating surfaces on hard disk drives is known for a variety of purposes. One such purpose is for containment of a gaseous medium within the hard disk drive. U.S. Patent Publication No. US-2012-0275105-A1 describes providing at least one metal coating over at least a portion of an exterior surface of a hard disk drive. Coating a hard disk drive as such is described as providing improved sealing of inert gases within a hard disk drive. While effective for sealing inert gases within a hard disk drive, such methods typically require specialized processing equipment and methodology for application of the metal coating. For example, formation of a metal coating using sputter coating methodology requires use of costly sputter chambers for coating of the hard disk drive and tightly controlled processing conditions during manufacture of such hard disk drives.

Materials other than metal are also coated on hard disk drives for sealing and additional purposes. For example, U.S. Patent Publication No. US-2012-0275286-A1 describes encapsulation of hard disk drives with polymeric coatings. The polymeric coatings are described as providing protective and/or decorative properties to the hard disk drive. U.S. Pat. No. 5,454,157 describes a disk drive assembly containing a metallic base and cover. In order to minimize escape of helium or nitrogen contained therein (via porosity in the metallic base and cover plates), a special electrostatic coating process and material called "E-coat" are used. E-coating, which is said to be a commercially available coating material and is known to be an insulative epoxy material, is applied to the surfaces of the base and cover as well as all other surfaces making up the hermetically sealed chamber. Such application of the E-coating takes place before the plates are assembled together. Every surface, inner and outer, of each plate is completely coated with a black E-coating as such. With the E-coating applied, the overall sealed chamber's porosity is purportedly lowered ninety-seven percent to an acceptable amount in order to contain the helium and nitrogen gas.

Sealing of hard disk drives is desired for not only containment of a gaseous medium within the hard disk drive, but for prevention of entry of liquid medium external to the hard disk drive. For example, with a growing emphasis on increasing storage density and decreasing device size, reduction of power consumption and reduction of heat generated during operation of hard disk drives is increasingly important.

Overheating is purported to be a common cause of hard disk drive failure. Overheating can, for example, cause platters in the drive to expand. If the disk's read-and-write head comes in contact with the disk's surface, a catastrophic head crash can result. Immersion of certain hard disk drives in liquid cooling mediums is, thus, being explored. For example, 3M markets engineered fluid heat transfer medium under the NOVEC trade designation for use with electronic components. In order to take advantage of such liquid cooling mediums, effective sealing of a hard disk drive to eliminate or minimize leakage is desired.

Elimination of or minimization of leakage is desired for other reasons as well. One such reason relates to a reduction of complications arising from electromagnetic interference.

Electromagnetic interference ("EMI," also called radio frequency interference or "RFI") is a usually undesirable disturbance caused in an electrical circuit by electromagnetic radiation emitted from an external source. Such disturbance may interrupt, obstruct, or otherwise degrade or limit the effective performance of the circuit.

EMI can be induced intentionally for radio jamming, as in some forms of electronic warfare, or unintentionally, as a result of spurious emissions and responses, intermodulation products, and the like. A source of EMI may be any object, artificial or natural, that carries rapidly changing electrical currents, such as another electrical circuit or even the sun or Northern Lights. Broadcast transmitters, two-way radio transmitters, paging transmitters, and cable television are also potential sources of EMI within residential and commercial environments. Other potential sources of EMI include a wide variety of common household devices, such as doorbell transformers, toaster ovens, electric blankets, ultrasonic pest controls (e.g., bug zappers), heating pads, and touch-controlled lamps. It is known that EMI frequently affects the reception of AM radio in urban areas. It can also affect cell phone, FM radio, and television reception, although to a lesser extent. EMI can similarly affect performance of a computer.

In conventional disk drives, unwanted and potentially problematic EMI wavelengths can enter a disk drive through a number of places. For example, similar to paths of gas leakage, such wavelengths can enter disk drive housings around screws used to hold multiple components of the housing together. Seams where components of the hard disk drive housing (e.g., cover and base) meet, are another potential path of gas leakage.

Within integrated circuits, the most important means of reducing EMI include the following: the use of bypass or "decoupling" capacitors on each active device (connected across the power supply and as close to the device as possible), risetime control of high-speed signals using series resistors, and VCC filtering. If all of these measures still leave too much EMI, shielding such as using radio frequency (RF) gasket seals (which are often very expensive) and copper tape has been employed. Another method of reducing EMI is via use of metal hard disk drive components. While the use of metal components undesirably increases the overall weight of an apparatus, use of metal components has been conventionally mandated in the hard disk drive industry due to the EMI sensitivity of mechanical spinning components therein. Without mechanical spinning components therein, however, manufacturers of flash drives have taken advantage of the benefits of, for example, a plastic case for enclosure of the drive. See, for example, U.S. Pat. No. 7,301,776, which describes how metal material used for top and bottom plates of the drives described therein can be replaced by plastic as there are fewer EMI issues associated with flash memory devices as compared to mechanical spinning hard disk drives.

Another source of potential hard disk drive failure stems from electrostatic discharge (ESD). ESD refers to a sudden and momentary electric current that flows between two objects at different electrical potentials. The term is usually used in the electronics and other industries to describe momentary unwanted currents that may cause damage to electronic equipment. Ways to eliminate problematic ESD are in need of improvement as performance demands of hard disk drives increase.

While the aforementioned problems typically arise based on events and/or materials external to a disk drive, other problems may arise based on events and/or materials internal to a disk drive. That is, design of components within conventional disk drives can contribute to hard disk drive failure. For example, plastic components are susceptible to outgassing and components made from conductive materials are prone to shedding of particles, both of which can cause catastrophic disk failure.

In view of the number of potential problems impacting effective and long-term performance of hard disk drives, alternative methods and apparatus for improved hard disk drives are desired. Most desired are those methods and apparatus with improved efficiency and reliability over conventional attempts to provide the same.

SUMMARY OF THE INVENTION

Improved hard disk drives of the invention are wrapped in laminate for enhanced sealing of the hard disk drive. Laminate-wrapped hard disk drives of the invention comprise: an enclosed hard disk drive housing comprising a base and a cover enclosed around internal components for facilitating reading and recording of data at a desired location on at least one disk contained within the housing; and a laminate wrapped around the enclosed housing in an at least partially overlapping manner to form the laminate-wrapped hard disk drive and prevent undesired migration therethrough such that a sealed environment exists within the laminate-wrapped hard disk drive, wherein the laminate comprises a barrier layer and an adhesive layer for adherence of the laminate to the enclosed housing. According to one aspect of the invention, the laminate-wrapped hard disk drive is hermetically sealed.

In one embodiment, the laminate is at least about 40 microns thick. In a further embodiment, the laminate is at least about 50 microns thick. For example, in one embodiment the laminate is about 50 microns to about 75 microns thick. In yet another embodiment, the laminate is at least about 200 microns thick. In one embodiment, at least two layers of the laminate are present on a major portion of the laminate-wrapped hard disk drive. In another embodiment, at least three layers of the laminate are present on a major portion of the laminate-wrapped hard disk drive The adhesive layer is a pressure-sensitive adhesive in a preferred embodiment. In one embodiment, the adhesive layer has a thickness of about 5 microns to about 150 microns. In a further embodiment, the adhesive layer is about 25 microns thick or less.

The barrier layer may be a non-constrained barrier layer or a constrained barrier layer. In an alternative embodiment, the laminate further comprises a second barrier layer. The barrier layer may be a metal foil or a metal coating (e.g., aluminum or stainless steel), for example. For example, the barrier layer is a metal foil and the second barrier layer is a metal coating constrained between first and second polymeric layers according to one aspect of this embodiment. In one embodiment, the barrier layer has a thickness of less than about 40 microns. In a further embodiment, the barrier layer has a thickness of about 25 microns.

In one embodiment, the laminate consists essentially of the barrier layer and the adhesive layer. In another embodiment, the laminate further comprises a protective layer. The protective layer is polyurethane-based in a preferred embodiment. According to one embodiment, the protective layer has a thickness of about 25 microns to about 100 microns. In a further embodiment, the protective layer has a thickness of about 20 microns to about 50 microns.

In another embodiment, the laminate further comprises at least one internal laminating adhesive layer. For example, the laminate consists essentially of the barrier layer interposed between a protective layer and the adhesive layer, with at least one optional internal laminating adhesive layer therebetween according to one embodiment. According to one aspect of this embodiment, each of the first and the second polymeric layers comprises polyurethane. According to another aspect of this embodiment, each of the first and the second polymeric layers has a thickness of about 5 microns to about 10 microns.

In yet another embodiment, the laminate consists essentially of two barrier layers, one constrained barrier layer and one non-constrained barrier layer, interposed between a protective layer and the adhesive layer, with at least one optional internal laminating adhesive layer therebetween.

A method for forming the laminate-wrapped hard disk drive of the invention comprises steps of: preparing the laminate; enclosing the base and the cover around the internal components to form the enclosed hard disk drive housing; sizing the laminate to fit around the enclosed hard disk drive housing; and wrapping the laminate around the enclosed hard disk drive housing to form the laminate-wrapped hard disk drive. In one embodiment, the laminate is stored for later wrapping around the enclosed hard disk drive housing after it is prepared. In another embodiment, any metal coating within the laminate is formed in the absence of the enclosed housing.

In one embodiment, the laminate is sized such that flap portions extending outward along a y-axis of the enclosed hard disk drive housing are at least as long as height of the enclosed hard disk drive housing during the step of wrapping the laminate. In another embodiment, the laminate is sized such that flap portions extending outward along a y-axis of the enclosed hard disk drive housing are at least two times as long as height of the enclosed hard disk drive housing during the step of wrapping the laminate. In yet another embodiment, the laminate is sized such that flap portions extending outward along a y-axis of the enclosed hard disk drive housing are at least three times as long as height of the enclosed hard disk drive housing during the step of wrapping the laminate.

According to one aspect of the invention, the step of wrapping the laminate around the enclosed housing comprises steps of: first wrapping the laminate around a portion of the enclosed hard disk drive housing having the largest surface area so that at least one layer of laminate is interposed between the enclosed hard disk drive housing and an end of the laminate visible on the yz- or yx-plane of the enclosed hard disk drive housing; and next wrapping the laminate around exposed sides of the enclosed hard disk drive housing extending along xz-planes of the enclosed hard disk drive housing. At least two layers of the laminate are interposed between the enclosed hard disk drive housing and an end of the laminate visible on the yz- or yx-plane of the wrapped hard disk drive during the step of first wrapping the laminate in one embodiment. At least three layers of the laminate are interposed between the enclosed hard disk drive housing and an end of the laminate visible on the yz- or yx-plane of the wrapped hard disk drive during the step of first wrapping the laminate in another embodiment.

According to a further embodiment, the method comprises a step of routing an electrical connector exiting the enclosed hard disk drive housing between opposing portions of the laminate as it is wrapped around the exposed sides of the enclosed hard disk drive housing extending along xz-planes of the enclosed hard disk drive housing. For example, a tortuous path is created by folding a wrapped portion of the electrical connector over the enclosed hard disk drive housing.

DETAILED DESCRIPTION OF THE PREFERRED EMBODIMENTS OF THE INVENTION

Laminates of the invention are beneficially applied in conjunction with a wide variety of conventionally formed hard disk drives (also referred to herein simply as "disk drives"). In general, a disk drive assembly conventionally includes a base to which various components of the disk drive are mounted. A top cover cooperates with the base to form a housing that defines an encased environment for the disk drive. Any hard disk drive comprises any of a number of suitable components encased within the housing. The internal components within the disk drive include, for example, a spindle motor, which rotates one or more magnetic disks at a constant high speed, and an actuator assembly for writing information to and reading information from circular tracks on the disks. The actuator assembly typically includes a plurality of actuator arms extending towards the disks, with one or more flexures extending from each of the actuator arms. Mounted at the distal end of each of the flexures is a read/write head, which includes an air bearing slider enabling the head to fly in close proximity above the corresponding surface of the associated disk during operation of the disk drive. When the disk drive is powered down, the heads may be moved to a landing zone at an innermost region of the disks where the air bearing sliders are allowed to land on the disk surface as the disks stop rotating. Alternatively, the actuator assembly may move (unload) the heads beyond the outer circumference of the disks so that the heads are supported away from the disk surface by a load/unload ramp when the drive is powered down.

Figure 1:
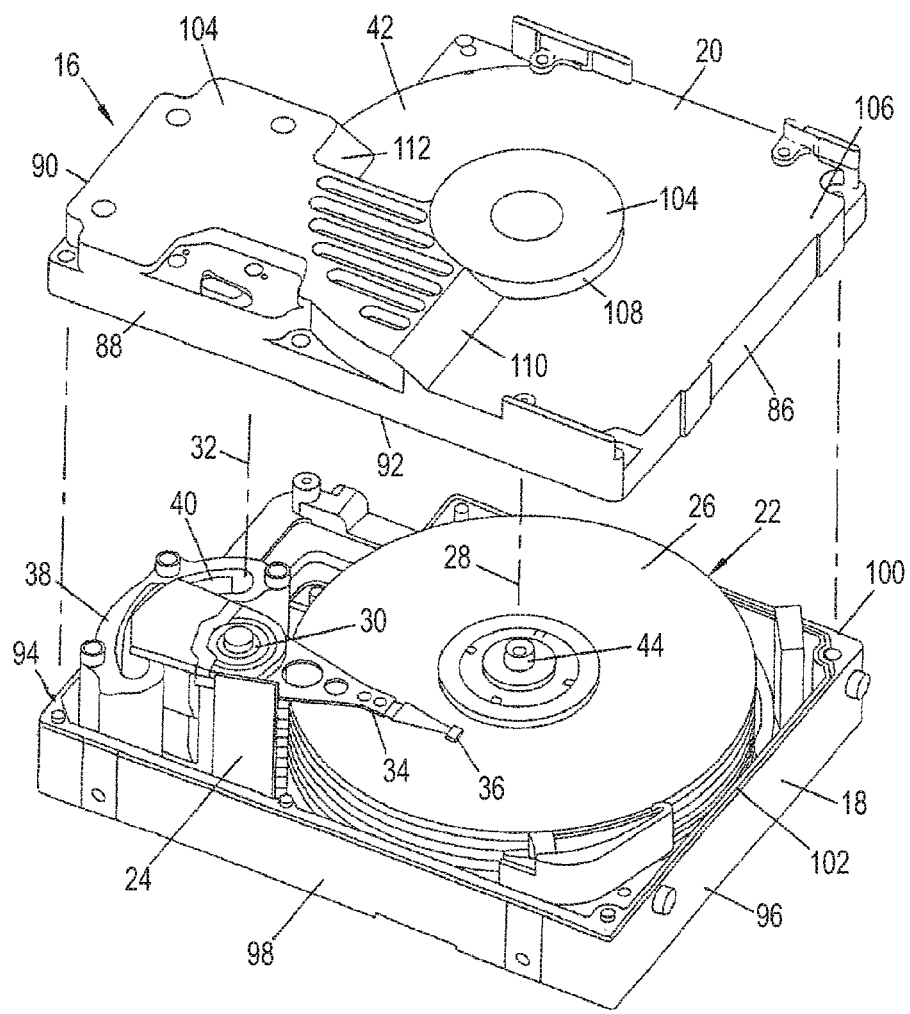
FIG. 1 is a partial perspective view of a prior art hard disk drive with the cover of the drive housing removed to illustrate certain features.

Turning now to the drawings, there is shown in FIG. 1 part of a prior art hard disk drive 16 described in U.S. Patent Publication No. 2003/0223148. The prior art hard disk drive 16 illustrated in FIG. 1 is only one example of many well-known embodiments of hard disk drives and is illustrated to show exemplary components of hard disk drives for use as a reference in conjunction with a description of the present invention. Recognize, however, that many conventional hard disk drives can be modified according to the improvements of the invention.

As shown in FIG. 1, a conventional hard disk drive 16 has a rigid outer housing including a base 18 and a cover 20. In FIG. 1, the cover 20 is removed from the base 18 to reveal a disk pack or spindle assembly 22 and a rotary actuator 24, both of which are mounted moveably with respect to the housing formed by the base 18 and cover 20. More particularly, the spindle assembly 22 includes a top disk 26 and several additional concentrically stacked and spaced-apart disks rotatable about a vertical spindle axis 28.

Rotary actuator 24 includes an actuator shaft 30 mounted to pivot relative to the base 18 about a vertical actuator axis 32. Transducer support arms, including a top support arm 34, are fixed to rotate with the actuator shaft 30. Each arm carries a magnetic data transducing head—e.g., a transducing head 36 on a support arm 34. The rotary actuator 24 pivots to move the transducing head 36 along arcuate paths generally radially with respect to the disks. Selective actuator 24 pivoting, in combination with controlled rotation of the disks, allows reading and recording of data at a desired location at any one of the disk recording surfaces. Rotary actuator 24 is pivoted by selective application of an electrical current to a voice coil 38 supported for arcuate movement within a magnetic field created by a permanent magnet arrangement 40, which includes several magnets and a poll piece (both of which are not illustrated in further detail).

The rotary actuator 24 and spindle assembly 22 are supported between two opposed housing walls, including a top wall 42 of the cover 20 and a bottom wall (not shown) of the base 18. Spindle shaft 44 and the actuator shaft 30 may be stationary—meaning that they are integral with the housing—with the disks and support arms being mounted to rotate relative to their respective shafts.

The cover 20 includes a vertical continuous sidewall structure including a rearward wall 86, two opposed sidewalls, one of which is shown at 88, and a forward wall 90. Here, the sidewall structure includes a generally flat, horizontal continuous bottom edge 92, though some embodiments may include a flange or other mated fitting so as to fit into a top edge 100 of base 18 facilitating a tight fit and/or laser-welding. The base 18 includes an vertical continuous sidewall structure including a forward wall 94, a rearward wall 96, and two opposed sidewalls, one of which is shown at 98. These walls 94, 96, 98 combine to form a continuous, horizontal top edge 100. FIG. 1 also illustrates an elastomeric gasket seal 102 mounted to top edge 100 of the base 18. When the cover 20 is assembled onto the base 18, the confronting bottom edge 92 of the cover 20 and the top edge 100 of the base 18 are brought into sealing engagement to close the housing about the spindle assembly 22 and the rotary actuator 24.

The upper and lower sidewalls 88, 98 are generally relatively thick to lend rigidity to the housing. The top wall 42 of the cover 20 may be formed with a horizontal full height region 104 and a horizontal recessed region 106, the two types of regions being interconnected by several non-horizontal regions as indicated at 108, 110 and 112. One portion of the full height region 104 accommodates the rotary actuator 24 and the spindle assembly 22. The non-horizontal regions 108, 110, 112 provide additional stiffness to the top wall 42 of the cover 20, which strengthens the top wall 42 and enables a somewhat reduced thickness wall construction.

During exemplary manufacture and assembly of a hard disk drive according to the invention, a base and a cover (i.e., a structural cover as opposed to a secondary sealing cover attached to an already enclosed housing) are provided and enclosed around components internal to the hard disk drive within a clean room environment. When an electrical connector is also to be assembled such that it protrudes external to the housing, it is likewise assembled within the clean room environment. Any suitable mechanism can be used to mechanically couple components (e.g., a base and cover) of the hard disk drive housing. A laminate of the invention is then wrapped around the entire exterior surface of the enclosed hard disk drive housing to create a sealed environment.

In contrast to coatings formed in-situ on an article, laminates of the invention are capable of being physically separated from a substrate on which they are formed and maintaining their integrity as a continuous structure. As such, laminates are preferably formed before manufacture of the hard disk drive in which enclosure of the hard disk drive housing occurs. The laminates can then be applied to the enclosed hard disk drive housing in a relatively efficient and unitary manner.

Figure 2A:
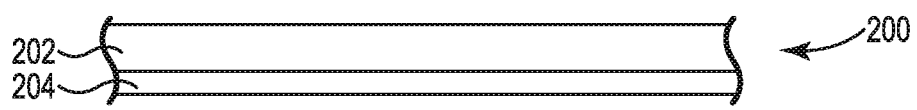
FIG. 2A is a cross-sectional view of one embodiment of a laminate for wrapping around a hard disk drive according to the invention.

In its most basic form, laminates of the invention comprise at least one barrier layer and an adhesive layer for ready adherence of the barrier layer to the external surface of the enclosed hard disk drive housing. The barrier layer may be constrained (i.e., the barrier layer is positioned between additional layers) or non-constrained (i.e., no additional layers surround the barrier layer). In one embodiment, as illustrated in FIG. 2A, a laminate 200 of the invention consists essentially of a barrier layer 202 and an adhesive layer 204. The barrier layer 202 shown in FIG. 2A is non-constrained.

Figure 2B:
FIG. 2B is a cross-sectional view of a further embodiment of the laminate of FIG. 2A.
Figure 2C:
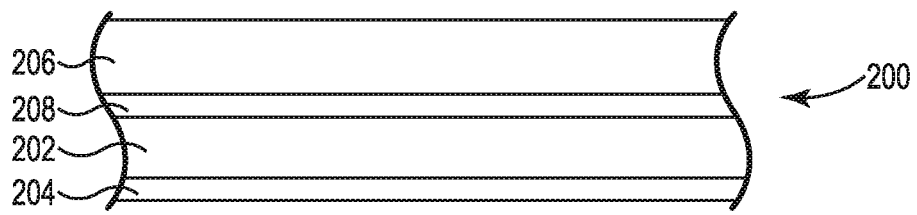
FIG. 2C is a cross-sectional view of a further embodiment of the laminate of FIG. 2B.

According to a further embodiment, as illustrated in FIG. 2B, a laminate 200 of the invention consists essentially of a barrier layer 202 interposed between an adhesive layer 204 and a protective layer 206. In order to adequately adhere layers in laminate form, when necessary, an internal laminating adhesive layer 208 is present between the barrier layer 202 and the protective layer 206, as illustrated in FIG. 2C. As compared to adhesive layer 204, laminating adhesive layer 208 is internally positioned between layers 202, 206 within the laminate 200 such that it is essentially not outwardly visible.

Figure 2D:
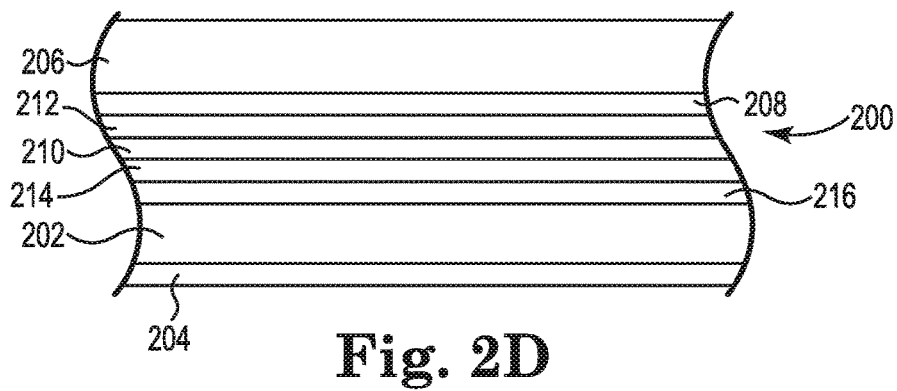
FIG. 2D is a cross-sectional view of another embodiment of a laminate for wrapping around a hard disk drive according to the invention.
Figure 2E:
FIG. 2E is a cross-sectional view of still another embodiment of a laminate for wrapping around a hard disk drive according to the invention.

According to another exemplary embodiment, as illustrated in FIG. 2D, a laminate 200 of the invention consists essentially of not only a first barrier layer 202, but also a constrained barrier layer 210. The constrained barrier layer 210 is constrained between first and second polymeric layers 212, 214. In order to adequately adhere layers in laminate form, when necessary, a laminating adhesive layer 208 is present between the outwardly exposed protective layer 206 and the first polymeric layer 212 constraining the constrained barrier layer 210. A laminating adhesive layer 216 is also present, when necessary, between the first barrier layer 202 and the second polymeric layer 214 constraining the constrained barrier layer 210, as illustrated in FIG. 2D. The sequence of layers may be rearranged so that the first barrier layer 202 is proximate the outwardly exposed protective layer 206 and the constrained barrier layer 210 is proximate the outwardly exposed adhesive layer 204, as illustrated in FIG. 2E. In all cases, as compared to adhesive layer 204, laminating adhesive layers 208, 216 are internally positioned between layers 202, 206, 212, 214 within the laminate 200 such that they are essentially not outwardly visible.

Figure 2F:
FIG. 2F is a cross-sectional view of yet another embodiment of a laminate for wrapping around a hard disk drive according to the invention.

According to another exemplary embodiment, as illustrated in FIG. 2F, a laminate 200 of the invention consists essentially of a constrained barrier layer 210 constrained between first and second polymeric layers 212, 214. In order to adequately adhere layers in laminate form, when necessary, a laminating adhesive layer 208 is present between the outwardly exposed protective layer 206 and the first polymeric layer 212 constraining the constrained barrier layer 210. Again, as compared to adhesive layer 204, laminating adhesive layer 208 is internally positioned between layers 202, 212 within the laminate 200 such that it is essentially not outwardly visible.

Figure 2G:
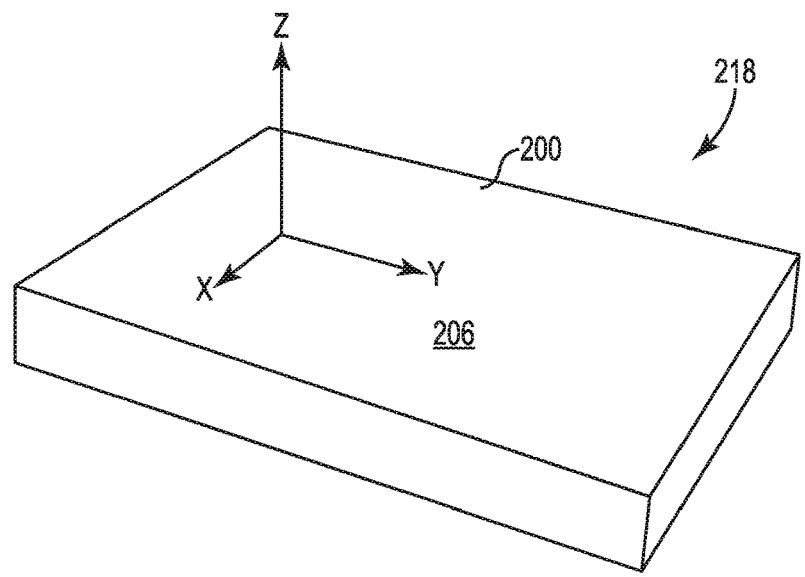
FIG. 2G is a perspective view of a hard disk drive comprising the laminate of FIG. 2B, FIG. 2C, FIG. 2D, FIG. 2E, or FIG. 2F wrapped therearound.

Depending on the configuration, as illustrated in FIGS. 2A-2F, each of the first barrier layer 202 and the constrained barrier layer 210, alone or in combination, functions to prevent undesired migration therethrough such that a sealed environment exists within wrapped hard disk drives according to the invention. For example, the barrier layers 202, 210 prevent or minimize migration of gaseous medium from within the wrapped hard disk drive 218 (e.g., helium or nitrogen when the hard disk drive is hermetically sealed) according to one embodiment as illustrated in FIG. 2G. According to another embodiment, the barrier layers 202, 210 prevent or minimize migration of oxygen from outside the wrapped hard disk drive 218. In yet another embodiment, the barrier layers 202, 210 prevent or minimize migration of liquid medium from outside the wrapped hard disk drive 218 (e.g., liquid cooling medium in which the hard disk drive is immersed).

Generally, to maximize benefits of the invention, a laminate 200 of the invention is wrapped around an enclosed hard disk drive housing such that the adhesive layer 204 contacts and adheres to the enclosed hard disk drive housing. In a preferred embodiment, the laminate 200 also comprises a protective layer 202 that is outwardly exposed on the wrapped hard disk drive 218.

As the laminate 200 is wrapped around the hard disk drive housing after it is enclosed around internal components for facilitating reading and recording of data at a desired location on at least one disk contained within the housing, the seam at which the base and cover components of the housing meet is not visible in laminate-wrapped hard disk drives of the invention. Moreover, in order to adequately seal the hard disk drive with the laminate, the laminate 200 is at least partially overlapped therearound so that the enclosed hard disk drive housing is not visible in laminate-wrapped hard disk drives of the invention.

According to the invention, a laminate 200 is wrapped around an enclosed hard disk drive housing in an at least partially overlapping manner to form the laminate-wrapped hard disk drive and prevent undesired migration therethrough such that a sealed environment exists within the laminate-wrapped hard disk drive. At least one layer of laminate 200 is interposed between any point on the exterior surface of the enclosed hard disk drive and the external environment. In one embodiment, at least two layers of the laminate 200 are present on a major portion of the laminate-wrapped hard disk drive. In a further embodiment, at least three layers of the laminate 200 are present on a major portion of the laminate-wrapped hard disk drive. As used throughout, "major portion" refers to at least about fifty-percent of the exterior surface area of the laminate-wrapped hard disk drive. According to one aspect of this embodiment, the referenced layers of the laminate 200 are present on at least about seventy-five-percent of the exterior surface area of the laminate-wrapped hard disk drive. According to another aspect of this embodiment, the referenced layers of the laminate 200 are present on at least about ninety-percent of the exterior surface area of the laminate-wrapped hard disk drive. According to yet another aspect of this embodiment, the referenced layers of the laminate 200 are present on one-hundred-percent of the exterior surface area of the laminate-wrapped hard disk drive.

The adhesive layer 204 comprises any suitable material. According to one embodiment, the adhesive layer 204 generally comprises a base polymer with one or more additives. While any suitable chemistry can be used for the base polymer in the adhesive layer 204,(meth)acrylate (i.e., acrylate and methacrylate) chemistry is preferred. In particular, an adhesive based on 2-ethyl hexyl acrylate, vinyl acetate, and acrylic acid monomers polymerized as known to those skilled in the art can be used as the base polymer. However, other suitable chemistries are known to those skilled in the art and include, for example, those based on synthetic and natural rubbers, polybutadiene and copolymers thereof, and polyisoprene and copolymers thereof. In a preferred embodiment, to promote self-adherence of the adhesive layer 204 to the hard disk drive, the adhesive layer 204 comprises a pressure-sensitive adhesive (PSA). Any suitable additives can optionally be used in conjunction with the base polymer in the adhesive layer 204.

The adhesive layer 204 comprises any suitable thickness. In one embodiment, the adhesive layer 204 has a thickness of about 5 microns to about 150 microns. In an exemplary embodiment, the adhesive layer 204 is about 25 microns thick or less. However, the thickness of the adhesive layer 204 can vary substantially without departing from the spirit and scope of the invention.

Barrier layers 202, 210 of the invention comprise any suitable metal, including aluminum, chrome, copper, stainless steel, and nickel. In a preferred embodiment, the barrier layers 202, 210 comprise a metal selected from aluminum and stainless steel.

In a preferred embodiment, barrier layer 202 takes the form of a metal foil. For example, the barrier layer 202 is a dead soft aluminum foil in one embodiment, such as in the laminate 200 illustrated in FIG. 2A. In another embodiment, the barrier layer 202 takes the form of a metal coating. For example, a barrier layer 202 comprising a metal coating can be formed on the protective layer 206, such as in the laminate 200 illustrated in FIG. 2B.

In an exemplary embodiment, the barrier layer 202 has a thickness of less than about 40 microns. In a preferred embodiment, the barrier layer 202 has a thickness of about 25 microns. Use of such a relatively thin barrier layer 202 contributes to its conformability within laminates 200 of the invention. For example, conformability of the barrier layer 202 facilitates intimate contact with the outwardly exposed adhesive layer 204 so that gaps are minimized and, preferably, eliminated therebetween. Such conformability improves sealing properties and also facilitates effective use of laminates 200 of the invention in covering hard disk drives having curved or other non-planar surfaces.

In a preferred embodiment, the constrained barrier layer 210 comprises a metal coating constrained by the first and second polymeric layers 212, 214. The first and second polymeric layers 212, 214 each comprise any suitable material and thickness. Each of the first polymeric layer 212 and the second polymeric layer 214 need not comprise the same material. Similarly, each of the first polymeric layer 212 and the second polymeric layer 214 need not have the same thickness. In an exemplary embodiment, however, each of the first and second polymeric layers 212, 214 comprises polyurethane and has a thickness of about 5 microns to about 10 microns.

The first and second polymeric layers 212, 214 assist in minimizing, and preferably eliminating, development of cracks in the constrained barrier layer 210, which is generally thinner than the other barrier layer 202 used in laminates 200 of the invention, especially when the other barrier layer 202 comprises a metal foil. As is understood by those of ordinary skill in the art, cracks within a barrier layer 202, 210 negatively affect sealing properties of the laminate 200. Nevertheless, in order to further guard against potential negative effects from development of cracks within barrier layers 202, 210 of the invention, use of both a first barrier layer 202 and a constrained barrier layer 210 for redundancy within a laminate 200 is advantageous, such as in the embodiments illustrated in FIGS. 2D-2E. In those embodiments, the first barrier layer 202 preferably takes the form of a metal foil.

Metal coatings can be formed using any suitable methodology, preferably using vacuum deposition, including, for example, spray coating (e.g., plasma coating), sputter coating, or plating techniques, as known to those of ordinary skill in the art. For example, the number and duration of passes using sputter coating equipment can vary depending on the nature of the metal, component, and desired properties. Multiple passes to form multiple contiguous layers was found to reduce or eliminate potential problems associate with pinholes or other defects often found in metal coatings. As such, formation of the metal coating using multiple passes is preferred. For example, at least two sputter coating passes, each pass forming a coating having an optical density of about 2.8, can be used to form an adequate metal coating according to one embodiment of the invention. Any material capable of being deposited or plated may be coated on the hard disk drive using technologies as known to those of ordinary skill in the art. For example, any sputter coating target material may be used to form the metal coating.

As used herein, a metal coating is defined as a single layer or multiple contiguous layers of essentially the same metal. The metal coating may be a continuous layer or a discontinuous layer or multiples thereof. Further, the thickness of the metal coating can vary according to properties desired. For ease of manufacture, however, it is often preferred that the metal coating is a uniformly thick coating of the same metal.

In one embodiment, the metal coating comprises at least two individual layers. In another embodiment, the metal coating comprises at least about four individual layers. In still another embodiment, the metal coating comprises at least about six individual layers. In yet another embodiment, the metal coating comprises at least about ten individual layers. Understand that each individual layer need not be the same thickness or type of metal; although, uniformity thereof is often preferred for process simplicity.

As discussed above, preferably the metal coating comprises multiple layers in order to minimize the possibility of pinholes or other defects negatively impacting shielding or containment properties of the hard disk drive. In those embodiments where containment of inert gas within the hard disk drive is of concern, the metal coating comprises more and/or thicker layers. When multiple layers are used, for example, the chance of defects resulting in through paths for undesired EMI and gaseous particles is minimized. The through transmission rate for such particles is essentially zero according to preferred embodiments. Preferably, the leakage rate for helium particles through laminates of the invention is less than about $3\times10^{-9}$ Pa·m³/sec.

While equipment and methodology for formation of metal coatings can be costly and require tightly controlled processing parameters, as compared to coating of a hard disk drive described in U.S. Patent Publication No. US-2012-0275105-A1, any metal coating in laminates 200 of the invention is not part of the basic hard disk drive manufacturing process. Rather, laminates 200 are prepared and typically stored for later use during the hard disk drive manufacturing process. Thus, use of metal coatings in barrier layers 202, 210 of the invention does not negatively affect efficiency of the basic hard disk drive manufacturing process by requiring that the hard disk drive itself be subjected to the coating equipment and methodology.

The outwardly exposed protective layer 206 functions to protect the barrier layers 202, 210 from damage, but its presence in laminates of the invention is optional. When present, any suitable material may be used for the protective layer 206. In an exemplary embodiment, the protective layer 206 comprises at least one of polyester, polyurethane, polyolefin, and thermoplastic elastomer (e.g., that sold by DuPont under the HYTREL trade designation) components. Due to its preferential resistance to punctures, for example, polyurethane is a preferred material for the protective layer 206.

The protective layer 206 can be any suitable thickness. In an exemplary embodiment, the protective layer 206 has a thickness of about 25 microns to about 100 microns. In another embodiment, the protective layer 206 has a thickness of about 20 microns to about 50 microns. In a further embodiment, the protective layer 206 has a thickness of about 25 microns to about 40 microns.

As discussed above, in order to adequately adhere layers in laminate form, when necessary, a laminating adhesive layer 208 is present between the outwardly exposed protective layer 206 and the first polymeric layer 212 constraining the constrained barrier layer 210. Similarly, when necessary, a laminating adhesive layer 216 is present between the first barrier layer 202 and the second polymeric layer 214 constraining the constrained barrier layer 210, as illustrated in FIGS. 2C-2F. Any suitable adhesive can be used for such laminating adhesive layers 208, 216, each of which may not comprise the same chemistry and/or thickness.

According to one embodiment, a laminating adhesive layer 208, 216 generally comprises a base polymer with one or more additives. While any suitable chemistry can be used for the base polymer, (meth)acrylate (i.e., acrylate and methacrylate) chemistry is preferred. In particular, an adhesive based on 2-ethyl hexyl acrylate, vinyl acetate, and acrylic acid monomers polymerized as known to those skilled in the art can be used as the base polymer. However, other suitable chemistries are known to those skilled in the art and include, for example, those based on synthetic and natural rubbers, polyurethane, polyester, polybutadiene and copolymers thereof, and polyisoprene and copolymers thereof. In one embodiment, the laminating adhesive layer 208, 216 comprises a pressure-sensitive adhesive (PSA).

If used, laminating adhesive layers 208, 216 comprise any suitable thickness. In one embodiment, the laminating adhesive layers 208, 216 each have a thickness of less than about 5 microns (e.g., about 2 microns).

Thickness of each of the layers within laminates 200 of the invention may vary, individually and in combination. Combined thickness of the layers in laminates of the invention is at least about 40 microns in one embodiment. In a further embodiment, the combined thickness is at least about 50 microns. In yet a further embodiment, the combined thickness is at least about 200 microns. As thickness increases, durability increases but conformability generally decreases. In an exemplary embodiment, however, the combined thickness is about 50 microns to about 75 microns.

Recognize, however, that additional layers may be included on exterior surfaces of the laminate 200 and removed before wrapping the laminate 200 around a hard disk drive according to the invention. For example, a release liner may be present to protect the adhesive layer 204 from particulate contamination and unwanted adherence of the same before the laminate 200 is wrapped around a hard disk drive. Before wrapping, the release liner, if present, is first removed.

In an exemplary embodiment, the laminate 200 is wrapped around a hard disk drive in much the same manner as wrapping a gift in paper. The laminate 200 is first sized to fit around the hard disk drive. The sized laminate 200 is then wrapped around the portion of the hard disk drive having the largest surface area (e.g., the top, bottom and largest sides of the hard disk drive, which extend along yz-planes and yx-planes illustrated in FIG. 2G). The laminate 200 is wrapped to overlap itself so that at least one layer of laminate 200 is interposed between the hard disk drive and an end of the laminate 200 visible on the yz- or yx-plane of the wrapped hard disk drive 218. In one embodiment, the laminate 200 is wrapped as such so that least two layers of laminate 200 are interposed between the hard disk drive and the visible end of the laminate 200 on the yz- or yx-plane of the wrapped hard disk drive 218. In a further embodiment, the laminate 200 is wrapped so that least three layers of laminate 200 are interposed between the hard disk drive and the visible end of the laminate 200 on the yz- or yx-plane of the wrapped hard disk drive 218.

The laminate 200 is then wrapped around the exposed sides of the hard disk drive, which extend along xz-planes illustrated in FIG. 2G. For example, a portion of the laminate 200 extending outward from a top side of the hard disk drive in the xy-plane along one exposed side of the hard disk drive is first folded down and then the portions of the laminate 200 extending outward from opposing sides of the hard disk drive in the yz-plane are folded inward by creating two diagonal creases. The portion of the laminate 200 extending outward from a bottom side of the hard disk drive in the xy-plane along the exposed side is then folded up to cover the side of the hard disk drive. When the adhesive layer of laminates 200 of the invention does not adequately adhere the folded laminate 200 to the hard disk drive, additional adhesive in the form of a tape, for example, can be used to improve adherence of the laminate 200 to the hard disk drive. The process is repeated for the opposing exposed side of the hard disk drive.

According to a preferred aspect of this embodiment, the laminate 200 is sized with relatively long flap portions of the laminate 200 extending along the y-axis of the hard disk drive at each exposed side of the hard disk drive. The flap portions should be at least as long as the height of the hard disk drive. By ensuring that such flap portions are relatively long, the migratory path at the interface between mating flap portions is increased accordingly. A longer migratory path corresponds to a decreased chance that liquid and/or gaseous medium is able to successfully enter or leave the wrapped hard disk drive 218. Preferably, each flap portion extends from the hard disk drive a distance of at least about two times, more preferably at least about three times, height of the hard disk drive before it is folded to cover each exposed side of the hard disk drive.

Figure 3A:
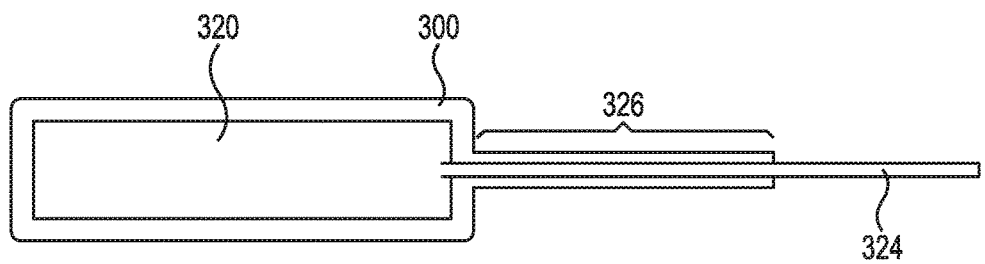
FIG. 3A is a cross-sectional view of a hard disk drive with an electrical connector being wrapped with a laminate according to the invention.
Figure 3B:
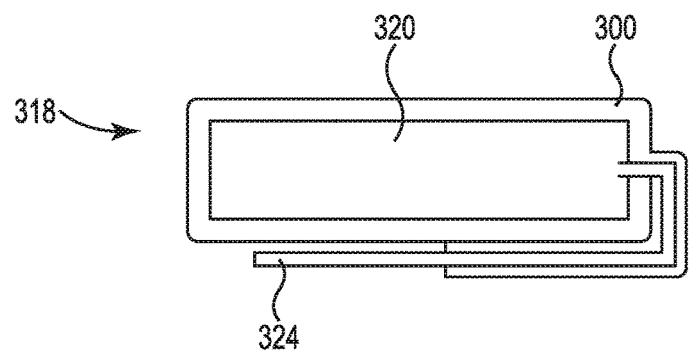
FIG. 3B is a cross-sectional view of a further embodiment of the hard disk drive of FIG. 3A.

If present, an electrical connector 324 exiting the hard disk drive 320 housing is routed between opposing portions of the laminate 300 as it is wrapped around the enclosed hard disk drive housing 320, as illustrated in FIG. 3A. For example, sides of the laminate 300 in the yz-plane extending from the sides of the enclosed hard disk drive housing 320 are first folded in and then sides of the laminate 300 in the xy-plane extending from the top and bottom of the enclosed hard disk drive housing 320 are pressed together before being folded over to form the laminate-wrapped hard disk drive 318. In order to further maximize the migratory path along the electrical connector 324 before it exits the wrapped hard disk drive 318, the wrapped portion 326 of the electrical connector 324 can be folded over the enclosed hard disk drive housing 320, such as in the manner illustrated in FIG. 3B. By folding the wrapped portion 326 of the electrical connector 324, a tortuous path is created to maximize the migratory path and, thus, minimize migration therethrough. Creation of tortuous paths for increasing the migratory path along electrical connectors exiting hard disk drive housings is described in U.S. Pat. No. 8,593,760, the contents of which are incorporated herein by reference. The tortuous paths described therein can be adapted according to the present invention by folding the laminate 300 accordingly. By folding the wrapped portion 326 of the electrical connector 324, the form factor of the wrapped hard disk drive 318 can also be optimized.

Given that the laminate 200 is wrapped around the hard disk drive to create a sealed environment, relatively difficult adhesion to what is, for example, often a metal surface (e.g., cast aluminum) on a hard disk drive is not an issue. The laminate 200 need not aggressively adhere to the exterior surface of the hard disk drive. However, the laminate 200 is stretched so that it intimately conforms to the topography of essentially the entire exterior surface of the hard disk drive when forming a wrapped hard disk drive 218 according to an exemplary embodiment, as illustrated in FIG. 2G.

Various modifications and alterations of the invention will become apparent to those skilled in the art without departing from the spirit and scope of the invention, which is defined by the accompanying claims. It should be noted that, unless indicated otherwise, steps recited in any method claims below do not necessarily need to be performed in the order that they are recited. Those of ordinary skill in the art will recognize variations in performing the steps from the order in which they are recited. In addition, the lack of mention or discussion of a feature, step, or component provides the basis for claims where the absent feature or component is excluded by way of a proviso or similar claim language. Further, as used throughout, ranges may be used as shorthand for describing each and every value that is within the range. Any value within the range can be selected as the terminus of the range. Similarly, any discrete value within the range can be selected as the minimum or maximum value recited in describing and claiming features of the invention. Finally, any material or performance properties described or measured herein are those existing at room temperature and atmospheric pressure unless specified otherwise.

The invention claimed is:

1. A laminate-wrapped hard disk drive comprising:
   an enclosed hard disk drive housing comprising a base and a cover enclosed around internal components for facilitating reading and recording of data at a desired location on at least one disk contained within the housing; and
   a laminate wrapped around the enclosed housing in an at least partially overlapping manner to form the laminate-wrapped hard disk drive and prevent undesired migration therethrough such that a sealed environment exists within the laminate-wrapped hard disk drive,
   wherein the laminate comprises a barrier layer and an adhesive layer for adherence of the laminate to the enclosed housing.

2. The hard disk drive of claim 1, wherein the laminate consists essentially of the barrier layer and the adhesive layer.

3. The hard disk drive of claim 2, wherein the barrier layer is a non-constrained barrier layer.

4. The hard disk drive of claim 2, wherein the barrier layer is a constrained barrier layer.

5. The hard disk drive of claim 1, wherein the laminate consists essentially of the barrier layer interposed between a protective layer and the adhesive layer, with at least one optional internal laminating adhesive layer therebetween.

6. The hard disk drive of claim 1, wherein the laminate further comprises at least one internal laminating adhesive layer.

7. The hard disk drive of claim 1, wherein the laminate further comprises a second barrier layer.

8. The hard disk drive of claim 7, wherein the barrier layer is a metal foil and the second barrier layer is a metal coating constrained between first and second polymeric layers.

9. The hard disk drive of claim 8, wherein each of the first and the second polymeric layers comprises polyurethane.

10. The hard disk drive of claim 8, wherein each of the first and the second polymeric layers has a thickness of about 5 microns to about 10 microns.

11. The hard disk drive of claim 1, wherein the laminate consists essentially of two barrier layers, one constrained barrier layer and one non-constrained barrier layer, interposed between a protective layer and the adhesive layer, with at least one optional internal laminating adhesive layer therebetween.

12. The hard disk drive of claim 1, wherein the laminate further comprises a protective layer.

13. The hard disk drive of claim 12, wherein the protective layer is polyurethane-based.

14. The hard disk drive of claim 12, wherein the protective layer has a thickness of about 25 microns to about 100 microns.

15. The hard disk drive of claim 12, wherein the protective layer has a thickness of about 20 microns to about 50 microns.

16. The hard disk drive of claim 1, wherein the barrier layer is a metal foil.

17. The hard disk drive of claim 1, wherein the barrier layer is a metal coating.

18. The hard disk drive of claim 1, wherein the barrier layer comprises a metal selected from aluminum and stainless steel.

19. The hard disk drive of claim 1, wherein the barrier layer has a thickness of less than about 40 microns.

20. The hard disk drive of claim 1, wherein the barrier layer has a thickness of about 25 microns.

21. The hard disk drive of claim 1, wherein the adhesive layer is a pressure-sensitive adhesive.

22. The hard disk drive of claim 1, wherein the adhesive layer has a thickness of about 5 microns to about 150 microns.

23. The hard disk drive of claim 1, wherein the adhesive layer is about 25 microns thick or less.

24. The hard disk drive of claim 1, wherein the laminate is at least about 40 microns thick.

25. The hard disk drive of claim 1, wherein the laminate is at least about 50 microns thick.

26. The hard disk drive of claim 1, wherein the laminate is at least about 200 microns thick.

27. The hard disk drive of claim 1, wherein the laminate is about 50 microns to about 75 microns thick.

28. The hard disk drive of claim 1, wherein the hard disk drive is hermetically sealed.

29. The hard disk drive of claim 1, wherein at least two layers of the laminate are present on a major portion of the laminate-wrapped hard disk drive.

30. The hard disk drive of claim 1, wherein at least three layers of the laminate are present on a major portion of the laminate-wrapped hard disk drive.

31. A method for forming the laminate-wrapped hard disk drive of claim 1, the method comprising steps of:
   preparing the laminate;
   enclosing the base and the cover around the internal components to form the enclosed hard disk drive housing;
   sizing the laminate to fit around the enclosed hard disk drive housing; and
   wrapping the laminate around the enclosed hard disk drive housing to form the laminate-wrapped hard disk drive.

32. The method of claim 31, wherein the laminate is stored for later wrapping around the enclosed hard disk drive housing after it is prepared.

33. The method of claim 31, wherein the laminate is sized such that flap portions extending outward along a y-axis of the enclosed hard disk drive housing are at least as long as height of the enclosed hard disk drive housing during the step of wrapping the laminate.

34. The method of claim 31, wherein the laminate is sized such that flap portions extending outward along a y-axis of the enclosed hard disk drive housing are at least two times as long as height of the enclosed hard disk drive housing during the step of wrapping the laminate.

35. The method of claim 31, wherein the laminate is sized such that flap portions extending outward along a y-axis of the enclosed hard disk drive housing are at least three times as long as height of the enclosed hard disk drive housing during the step of wrapping the laminate.

36. The method of claim 31, wherein any metal coating within the laminate is formed in the absence of the enclosed housing.

37. The method of claim 31, wherein the step of wrapping the laminate around the enclosed housing comprises steps of:
   first wrapping the laminate around a portion of the enclosed hard disk drive housing having the largest surface area so that at least one layer of laminate is interposed between the enclosed hard disk drive housing and an end of the laminate visible on the yz- or yx-plane of the enclosed hard disk drive housing; and
   next wrapping the laminate around exposed sides of the enclosed hard disk drive housing extending along xz-planes of the enclosed hard disk drive housing.

38. The method of claim 37, further comprising a step of routing an electrical connector exiting the enclosed hard disk drive housing between opposing portions of the laminate as it is wrapped around the exposed sides of the enclosed hard disk drive housing extending along xz-planes of the enclosed hard disk drive housing.

39. The method of claim 38, wherein a tortuous path is created by folding a wrapped portion of the electrical connector over the enclosed hard disk drive housing.

40. The method of claim 37, wherein at least two layers of the laminate are interposed between the enclosed hard disk drive housing and an end of the laminate visible on the yz- or yx-plane of the wrapped hard disk drive during the step of first wrapping the laminate.

41. The method of claim 37, wherein at least three layers of the laminate are interposed between the enclosed hard disk drive housing and an end of the laminate visible on the yz- or yx-plane of the wrapped hard disk drive during the step of first wrapping the laminate.

* * * * *